J. JACKSON.
Apparatus for Checking Horses.
No. 143,244. Patented September 30, 1873.
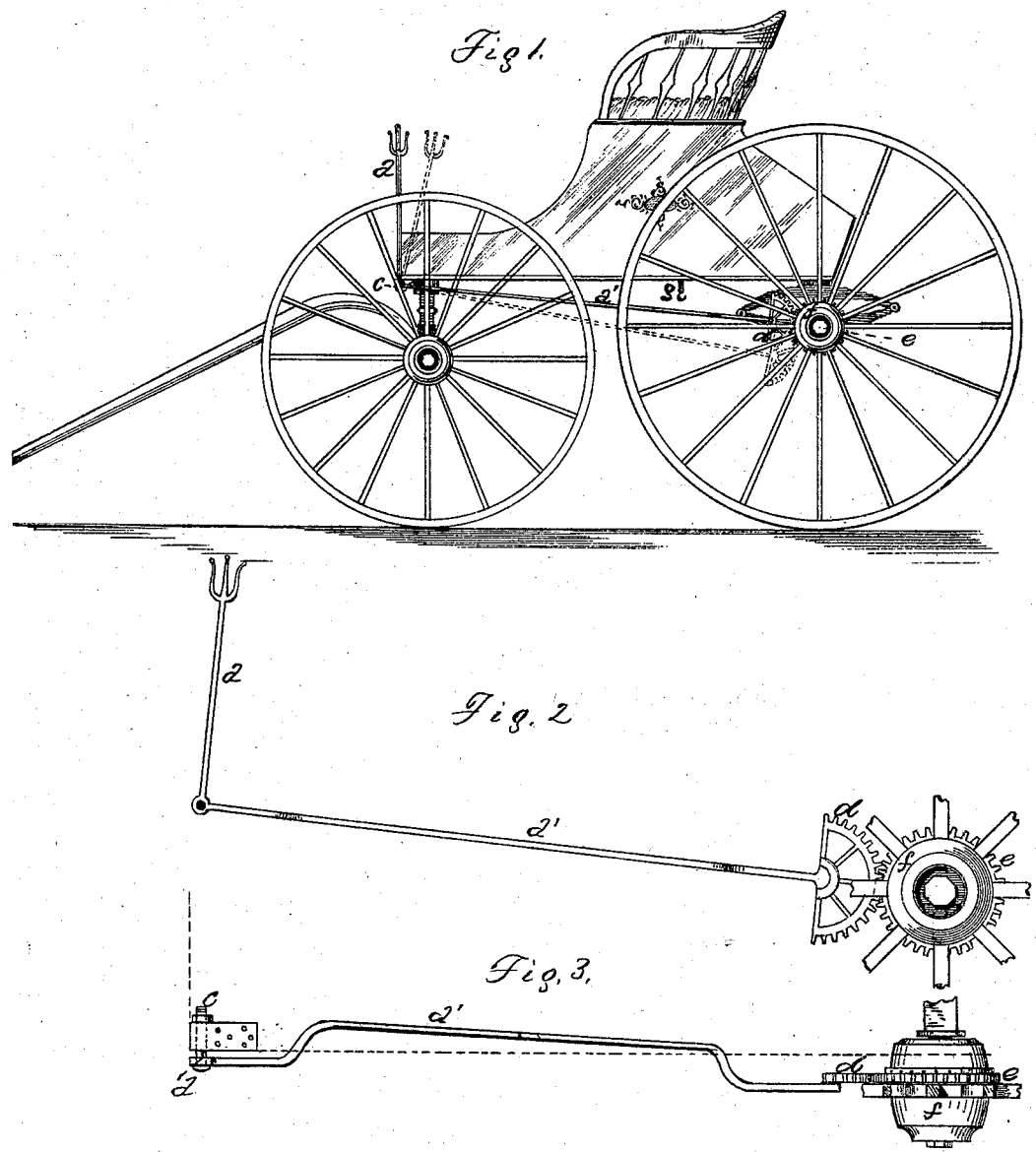
WITNESSES.
S. E. Simonds
John Pollitt
INVENTOR.
John Jackson.
By W. E. Simonds
Atty

UNITED STATES PATENT OFFICE.

JOHN JACKSON, OF HARTFORD, CONNECTICUT, ASSIGNOR OF ONE-HALF HIS RIGHT TO GEORGE ROHRMAYER, OF SAME PLACE.

IMPROVEMENT IN APPARATUS FOR CHECKING HORSES.

Specification forming part of Letters Patent No. 143,244, dated September 30, 1873; application filed December 30, 1872.

*To all whom it may concern:*

Be it known that I, JOHN JACKSON, of Hartford, in the county of Hartford and State of Connecticut, have invented a new and useful Horse-Hitching Attachment for Wagons and other Vehicles, of which the following is a specification, reference being had to the accompanying drawings, in which—

Figure 1 is a side view of a pleasure-wagon having my attachment. Fig. 2 is an enlarged side view of the attachment detached from the wagon. Fig. 3 is a top view of the parts shown in Fig. 3, the dotted line indicating the side of the wagon.

The letters $a$ $a'$ indicate a bent lever, of which $a$ may be called the upright part, and $a'$ the horizontal part, pivoted to the side of the wagon upon the pin $c$. Upon the end of the part $a'$ is a half-gear, $d$, with spur-gears meshing into the gear $e$, which is a collar or rim gear slipped upon the inner side of the hub $f$. The top of the upright $a$ is three-pronged, or of other convenient form, and to this are fastened the reins when the horse stops and the driver wishes to alight.

While the carriage or wagon is in motion the rod $a'$ remains suspended by the hook and chain $g$, so that the half-wheel $d$ is not in mesh with the gear $e$; but when the driver alights he releases the rod $a'$ and puts it into mesh with the gear $e$. If, now, the horse backs, the top of the rod $a$ is thrown forward, and his motions are not interfered with. If he starts forward the top of the rod $a$ is thrown backward, and the horse is checked by a backward pull upon the reins. When this backward pull has increased to such a force that further force is useless, the half-wheel $d$ will have moved down far enough to unmesh from the gear $e$. When from this point the horse backs to his original starting-point, the half-wheel will have moved back to its original position, and the pull upon the reins will cease.

Although I have shown the pivot $c$ placed near the front end of the wagon, it can be placed at any other point along the side of the wagon, the length and shape of the rod $a$ $a'$ being varied to adapt it to the position of the pivot. The attachment may be placed upon either side of the wagon, and used upon a two-wheeled as well as a four-wheeled vehicle.

I am aware of the patent to John C. Hancock and Edward P. Richardson for "horse-detaching apparatus," dated July 12, 1870; but I lay no claim to the invention which does or lawfully might form the subject-matter of said patent.

I claim as my invention—

The rod $a$ $a'$, pivoted to the vehicle, one end coming up at the front or side of the same, and the other end bearing the half-gear $d$, or its equivalent, meshing into the gear $e$, attached to the hub or wheel, the whole combined and arranged to operate substantially as and for the purpose set forth.

JOHN JACKSON.

Witnesses:
WM. E. SIMONDS,
JOHN POLLITT.